United States Patent [19]

McCord

[11] 4,031,184

[45] June 21, 1977

[54] PROCESS FOR RECLAIMING CEMENT KILN DUST AND RECOVERING CHEMICAL VALUES THEREFROM

[75] Inventor: Andrew T. McCord, Snyder, N.Y.

[73] Assignee: Donald L. Christensen, Bismarck, N. Dak. ; a part interest

[22] Filed: Jan. 14, 1976

[21] Appl. No.: 649,064

[52] U.S. Cl. .............................. 423/197; 23/302 R; 106/100; 423/499
[51] Int. Cl.² .......................................... C01D 3/08
[58] Field of Search .......... 210/51, 54 R; 423/197, 423/164, 499, 163, 184, 158; 23/302 R; 106/100

[56] References Cited

UNITED STATES PATENTS

| | | | |
|---|---|---|---|
| 1,354,642 | 10/1920 | Anderson et al. | 423/197 |
| 1,402,173 | 1/1922 | Moon | 423/196 |
| 2,347,147 | 4/1944 | Booth | 210/54 R |
| 2,988,504 | 6/1961 | Mazurek | 210/54 R |
| 3,647,395 | 3/1972 | Dean | 23/302 |
| 3,925,534 | 12/1975 | Singleton et al. | 423/499 |

OTHER PUBLICATIONS

Yusa et al, "Separating Liquids from Solids by Pellet Flocculation," Research Journal (July 1975), pp. 397–402.
Kirk–Othmer, "Encyclopedia of Chemical Technology," vol. 8, 2nd Edition, (1963), pp. 837, 838, 845–847.

Primary Examiner—O. R. Vertiz
Assistant Examiner—Wayne A. Langel
Attorney, Agent, or Firm—Karl W. Brownell

[57] ABSTRACT

This invention relates to a process of reclaiming cement kiln dust and recovering the alkali content thereof which comprises leaching the cement kiln dust at elevated temperatures with an aqueous solution of potassium chloride, treating the leached slurry of cement kiln dust with a relatively small amount of oil and a fatty acid to flocculate, and preferably pelletize, the solids, in the aqueous phase, extracting the flocculated or pelletized dust from the aqueous phase, desirably lightly washing or rinsing the flocculated or pelletized material to still further reduce the alkali content, cooling the leaching solution to throw down or precipitate potassium chloride crystals by crystallization, and removing the crystallized material therefrom. The residual leaching solution, after removal of substantial amounts of potassium chloride crystals, is still saturated with potassium chloride in solution, and after reheating is available for recycling with additional cement kiln dust.

10 Claims, No Drawings

PROCESS FOR RECLAIMING CEMENT KILN DUST AND RECOVERING CHEMICAL VALUES THEREFROM

PRIOR ART AND BACKGROUND

The manufacture of Portland cement results in the generation of extremely large tonnages of waste dust known as cement kiln dust. Excessive pollution when this dust is allowed to go up the stack and into the atmosphere, as well as the economic considerations involved in its loss, has required that this dust be trapped and collected by electrostatic precipitators or other means. Efforts to re-use the dust by returning it to the kiln in the form in which it is collected have not been entirely satisfactory for two basic reasons.

Firstly, such is in such fine form that a high proportion of it is again carried up the exhaust gases before it enters into the cement-forming reaction and thus lost to the operation, as well as placing an excessive burden on the stack dust-collecting system.

But more importantly, the waste dust contains an excessively high alkali metal sulphates and chlorides which cannot be tolerated in the making of cement of acceptable quality. As pollution standards are raised and/or stack collecting equipment is increased in effectiveness so that dust of greater fineness particle size is collected, this latter problem is intensified, as it is known from analyses that generally the alkali content increases with any increase in fineness of the dust. Procedures heretofore proposed for changing the physical form and/or lowering the alkali content of cement kiln dust have been unattractive or impractical for economic or other reasons.

For example, over 50 years ago U.S. Pat. Nos. 1,354,642 and 1,402,173 proposed to treat cement kiln dust with a calcium chloride solution to convert the alkali metal sulphates to alkali metal chlorides, separating the solution from the solids, and recovering the potassium chloride from the solution. However, the proposed process has never been well received, presumably because, inter alia, it is uneconomical, presenting the difficulty of separating the solids from the waste liquor, as well as the environmental problem of disposing of the large volume of waste liquor.

DETAILED DESCRIPTION OF PRESENT PROCESS

I have found that waste cement kiln dust, regardless of its degree of fineness and its alkali metal content, can be treated economically to convert it to both a physical form and chemical content suitable for recycling in the cement-making process, with the facile recovery of the alkali metal content as potassium chloride in relatively pure, crystal form. My process comprises the following sequence of operations.

The waste cement kiln dust as it is collected from the stack or elsewhere by electrostatic precipitators or other means is first treated by leaching it with a hot aqueous solution of potassium chloride heated to a temperature of 70 to 80 Degrees Centigrade. The ratio of dust to leaching solution is usually about one part by weight of dust to two to three parts by weight of leaching solution. The leaching solution preferably contains a sufficient amount of calcium chloride to convert any sulphates and carbonates of potassium in the cement kiln dust to soluble potassium chloride. The concentration of potassium chloride in the leaching solution is desirably such that the solution is saturated with potassium chloride when at a temperature of 10 to 20 Degrees Centigrade.

After the cement dust has been sufficiently mixed with the leaching solution, usually about 30 minutes, to assure that the sulphates and carbonates of potassium present in the dust have been converted to potassium chloride, the resulting cement dust slurry is treated with a small quantity of oil containing a fatty acid.

When a small proportion of oil is used, say, in the order of 1% by weight based on the weight of solids in the slurry, rapid flocculation occurs and separation of the flocculated solids from the solution can be readily and rapidly effected by filtering or centrifuging.

When a somewhat larger proportion of oil is used, in the order of about 5% by weight based on the weight of the solids in the slurry, flocculation proceeds to the point of pelletizing of the solids. Because the solids when thus treated are hydrophobic and extremely dense with a specific gravity of over 2, almost instant settling occurs. Consequently, the solids can be readily and effectively separated from the aqueous solution by screening. The solids can be removed at this point for recycling, but preferably are rinsed or washed with a relatively small amount of water to remove any residual potassium chloride, and this water is added to the leaching solution.

The oil used in the flocculating or pelletizing operation can be any of the fuel oils, lubricating oil, waste crank case oil, in fact, any oily hydrocarbon including mineral spirits, petroleum derived solvents, mineral or vegetable oils, mineral fats or the like, and the amount of this addition is usually in the order of 1% by weight based on the weight of solids in the slurry, although it can be as high as 10%.

The fatty acid can be any long chain fatty acid, and is added as a 1 solution dissolved in the selected oil, although as the amount of oil added to the slurry is increased above 1 to 10% of the solids content of the slurry, the concentration of fatty acid contained in the oil can be lowered to as low as around 0.1% when 10% is added to the slurry.

Following removal of the solids in flocculated or pelletized form from the leaching solution by filtration, centrifuging, or settling and screening, as the case may be, the still hot, leaching liquor is then cooled to 10° to 20° to throw down and crystallize out of solution substantially all the potassium chloride that has been dissolved from the cement kiln dust. The crystallized potassium chloride is extracted from the liquid in relatively pure crystallized form, leaving an aqueous mother liquor that is saturated with potassium chloride at the 10° to 20° C temperature to which it has been cooled. The liquid is then reheated to 70° or 80° C., such as by passing it through a suitable heat exchanger, whereupon it is ready for recycling for leaching of more cement kiln dust.

As is obvious from the above description there is no water or filtrate discharge from the system, thereby eliminating any environmental disposal problem.

Example I 300 pounds of an electrostatically precipitated cement kiln dust was leached at 80° C. with 900 pounds of a recycled potassium chloride brine which contained 243 pounds of potassium chloride and in which 14 pounds of calcium chloride had been dissolved. The cement dust contained 19 pounds of potassium chloride and 22.2 pounds of potassium sulphate as determined by analysis.

The leaching was carried out by thoroughly mixing the dust with the leaching brine for 30 minutes. Meanwhile 68 grams (0.15 pounds) of tall oil heads (a fatty acid derived from the paper industry) was dissolved in 15 pounds of No. 4 fuel oil.

This solution of fatty acid in oil was rapidly added to the leached slurry of cement kiln dust and rapidly and vigorously mixed. The entire solids content of the slurry quickly separated as small oily spheres. Continued mixing for 1 minute converted these into larger spheres or pellets about 3 – 5 mm. in diameter. As soon as the agitation was stopped, the pellts dropped to the bottom of the tank. A simple decantation removed the hot mother liquor and left the pellets, which consisted of oil-wetted dust, in the bottom of the tank. Five pounds of water at 80° C. was added to the pellets, the mixture was stirred, and the liquid drained off. This procedure was repeated. Approximately 11 pounds of liquid was recovered and added to the hot mother liquor. These pellets contained 280 pounds of solids, consisting of about 259 pounds of the original dust, almost free of alkali and 21 pounds of gypsum, $CaSO_4 \cdot 2H_2O$.

The mother liquor, together with the wash or rinsing water, weighed 940 pounds and upon cooling to 20° C. deposited potassium chloride crystals. These were separated on a screen and weighed 39 pounds (wet). The separated mother liquor which weighed 900 pounds was reheated and the process was repeated with 300 pounds of new cement kiln dust.

When operating continuously or over several cycles of a batch operation, additional calcium chloride must be added to provide an adequate amount for converting other potassium salts in the cement kiln dust to potassium chloride.

Example II

The process of Example I was repeated except that the 900 pounds of leach liquor, saturated with potassium chloride at 20° C., was heated to 80° C. and then 31 pounds of 30% hydrochloric acid was added in place of the calcium chloride.

The HCl immediately reacted with lime in the cement dust to produce 14 pounds of calcium chloride. Otherwise, the process is the same as that of Example I.

Example III

The procedure of Example I was followed except that flocculation was achieved by adding 3 pounds of a 1% solution of tail oil fatty acids in No. 2 fuel oil.

In this case intense flocculation occurred, but the particle size of the flocculated material was below 1 mm. The solids settled rapidly and most of the mother liquor was easily decanted. The remaining slurry was then fed to a centrifuge and the centrifuge cake was washed by spraying a fine mist of water in four equal amounts of 4 pounds each. Otherwise the process is the same as in Example I.

The herein-described process of the present invention offers many advantages over previously proposed ways of recovering cement kiln dust. The concept of utilizing a concentrated solution of potassium chloride as the leaching liquor and taking advantage of the markedly increased solubility of potassium chlorid at 70° to 80° C. over the lower solubility of potassium chloride at 10 to 20° C., with the resultant elimination of a waste liquor disposal problem is of prime significance to the present great need for environmental improvement.

Furthermore, the concept of including in the reclamation process the oil-fatty acid treatment to effect flocculation or pelletization, thereby facilitating rapid and effective separation of the solids from the leaching solution after treatment renders the present process advantageous over previously suggested procedures where separation of the leaching solution has not been economical, and at times even impractical. A still further feature of the present process is that it lends itself very easily to a continuous operation instead of a batch operation, thereby effecting substantial additional savings by permitting the utilization of smaller tanks, agitators and other processing equipment than would be required by a batch operation—a saving in the both the initial investment and in maintenance.

I claim

1. A process for reclaiming cement kiln dust in usable form and recovering the alkali values thereof comprising leaching the cement kiln dust at an elevated temperature with an aqueous solution of potassium chloride, treating the leached slurry of cement kiln dust with a relatively small amount of oily hydrocarbon in the order of 1% to 10% by weight based on the weight of solids in the slurry and a long chain fatty acid amounting to at least 0.1% by weight based on the weight of the added oily hydrocarbon to flocculate the solids in an aqueous phase, separating the solids, cooling the resulting aqueous phase to crystallize potassium chloride out of solution, and separating the crystallized potassium chloride from the solution.

2. A process according to claim 1 in which the flocculated dust, after separation from the aqueous phase, is lightly washed with water to further remove any residual potassium chloride.

3. A process according to claim 1 in which the leaching is carried out at a temperature of 70° to 80° C.

4. A process according to claim 1 in which the leaching solution, after extraction of the flocculated cement dust, is cooled to 10° to 20 C. to crystallize out potassium chloride.

5. A process according to claim 1 in which the leaching solution, after removal of the crystallized potassium chloride, is reheated and recycled for the leaching of additional cement kiln dust.

6. A process according to claim 1 in which the leaching solution contains a sufficient amount of calcium chloride to convert any insoluble salts of potassium contained in the cement kiln dust to soluble potassium chloride.

7. A process according to claim 1 in which the leaching solution contains a sufficient amount of HCl to convert any insoluble salts of potassium contained in the cement kiln dust to soluble potassium chloride.

8. A process according to claim 1 in which the amount of oil used to flocculate the cement dust slurry is in the order of 1% by weight based on the weight of the solids content of the slurry.

9. A process for reclaiming cement kiln dust in usable form and recovering the alkali values thereof comprising leaching the cement kiln dust at an elevated temperature with an aqueous solution of potassium chloride, treating the leached slurry of cement kiln dust with a relatively small amount of oily hydrocarbon in the order of 1 to 10% by weight based on the weight of solids in the slurry and a long chain fatty acid amounting to at least 0.1% by weight based on the weight of the added oily hydrocarbon to flocculate the solids, and agitating to pelletize the solids in an aqueous phase, extracting the pelletized solids from the aqueous phase, cooling the resulting aqueous phase to crystallize potassium chloride out of solution, and separating the crystallized potassium chloride from the solution.

10. A process according to claim 9 in which the amount of oil used to pelletize the cement dust slurry is in the order of about 5% by weight based on the weight of the solids content of the slurry.

* * * * *